United States Patent [19]

Devine

[11] 4,088,257
[45] May 9, 1978

[54] ULTRASONIC SPOT WELDER

[75] Inventor: Janet Devine, West Chester, Pa.

[73] Assignee: Christiana Metals Corporation, West Chester, Pa.

[21] Appl. No.: 768,458

[22] Filed: Feb. 14, 1977

[51] Int. Cl.² .......................... B23K 1/06; B23K 5/20
[52] U.S. Cl. ..................... 228/110; 156/73; 228/1 R
[58] Field of Search ............... 228/110, 111, 1; 156/73

[56] References Cited
U.S. PATENT DOCUMENTS

| | | | |
|---|---|---|---|
| 2,946,119 | 7/1960 | Jones | 228/110 |
| 3,209,447 | 10/1965 | Jones | 228/110 |
| 3,440,117 | 4/1969 | Soloff | 156/73 |
| 3,468,731 | 9/1969 | Obeda | 228/110 X |

Primary Examiner—Donald G. Kelly
Attorney, Agent, or Firm—Seidel, Gonda & Goldhammer

[57] ABSTRACT

An ultrasonic spot welder is disclosed with a reed of resonant length arranged to be vibrated in a flexural mode for spot welding both plastics and metals. The reed has a non-circular cross section with major and minor transverse dimensions. Vibratory energy is transmitted to the reed in a direction perpendicular to its major transverse dimension.

10 Claims, 5 Drawing Figures

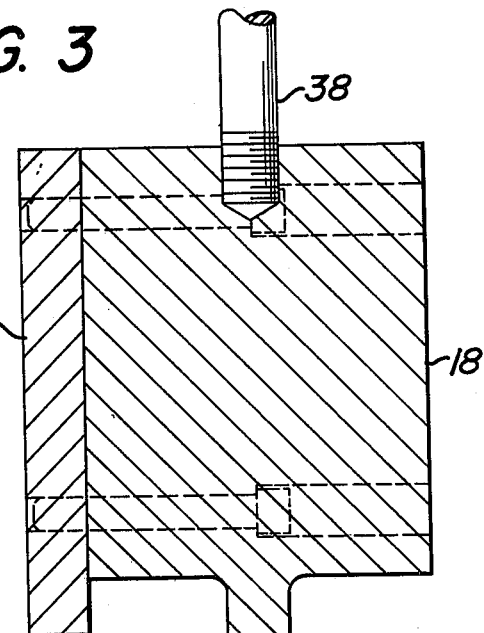
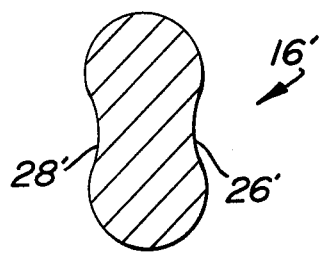
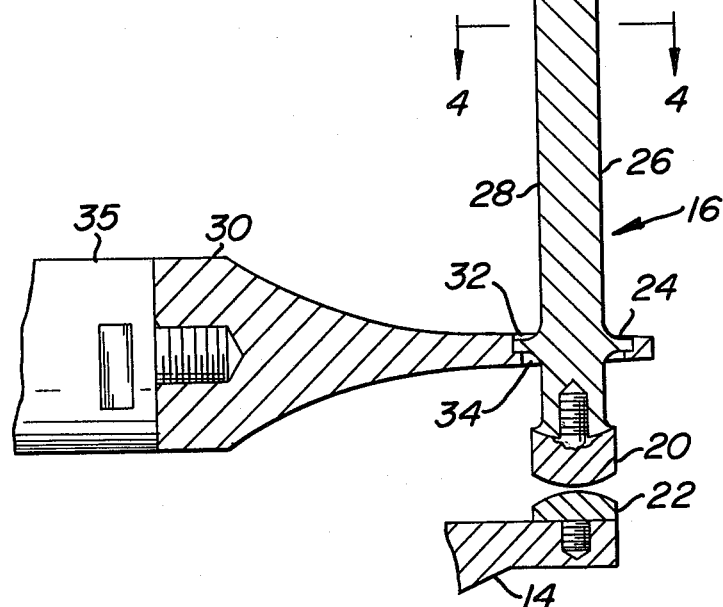
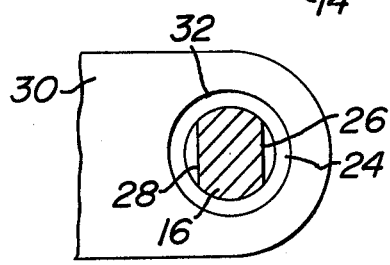

ULTRASONIC SPOT WELDER

BACKGROUND

The basic concepts and parameters of a non-fusion ultrasonic welder are disclosed in U.S. Pat. No. 2,946,119. The various embodiments disclosed in said patent are designed for the welding of metal members. Heretofore, a welder designed for welding metal members was not adaptable for use in welding plastic members and vice versa.

The present invention solves the problem of requiring two separate welders by providing one welder of the type shown in FIG. 9 of said patent which is capable of welding either metal members or plastic members with only minor modification in the design of the flexural reed.

SUMMARY OF THE INVENTION

The non-fusion welder of the present invention includes a reed of resonant length and having a circular flange intermediate its ends. The flange is bonded to a resonant coupler member having its longitudinal axis perpendicular to the longitudinal axis of said reed for vibrating the reed in a flexural mode. The reed is of non-circular cross section so as to have major and minor transverse dimensions. The coupler member flexes the reed in a direction perpendicular to its transverse major direction and perpendicular to the longitudinal axis of the reed whereby the amplitude of displacement of the reed will be substantially increased. With the increased amplitude of displacement of the reed, metal members as well as plastic members may be welded by varying the clamping force applied to the reed depending upon the nature of the members being welded.

In a preferred embodiment of the present invention, the minor transverse dimension of the reed is defined by a pair of flat surfaces. In order that welding can occur, it is not possible to merely take a cylindrical reed of a welder and apply flats to opposite faces of the reed. Instead, it is essential to maintain the cross sectional area of the reed. This is accomplished by starting out with a reed having a diameter greater than that which is needed and then machining or otherwise applying flats to the reed so that the resulting cross sectional area corresponds to that which is required for proper welding. In other words, the cross sectional area of the reed in the present invention is the same as that utilized heretofore but the cross sectional shape is different so as to provide for an increased amplitude of displacement.

It is an object of the present invention to provide an ultrasonic welder capable of welding both plastic members and metal members.

It is another object to provide a resonant flexural reed with increased amplitude of displacement for use in an ultrasonic tool.

It is another object of the present invention to provide a non-fusion welder having a reed of resonant length which can be vibrated in a flexural mode with substantially higher amplitudes of displacement and/or which permits attaining a spot weld with higher frequencies.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a sectional view taken along the line 3—3 in FIG. 1.

FIG. 4 is a sectional view taken along the line 4—4 in FIG. 3.

FIG. 5 is a cross sectional view of another embodiment of the reed.

Figure 1:
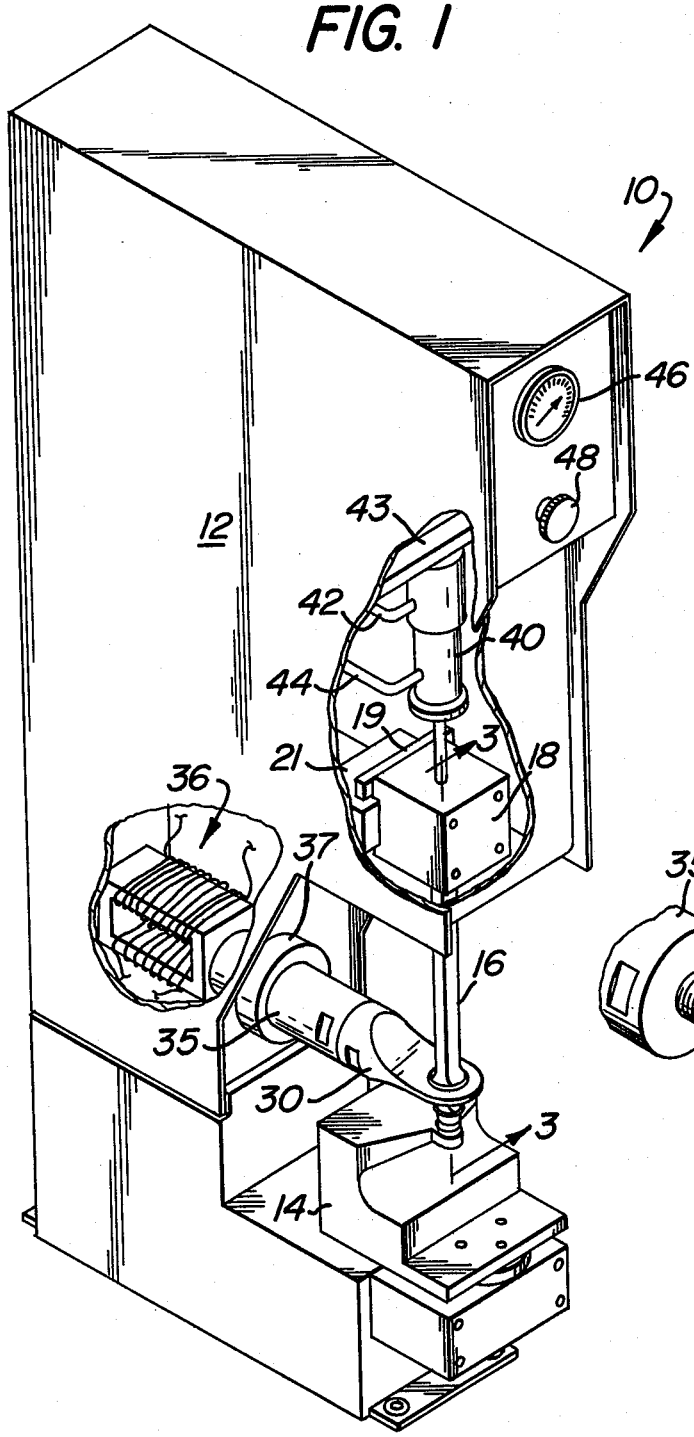
FIG. 1 is a perspective view of a welder in accordance with the present invention with portions broken away for purposes of illustration.
Figure 2:
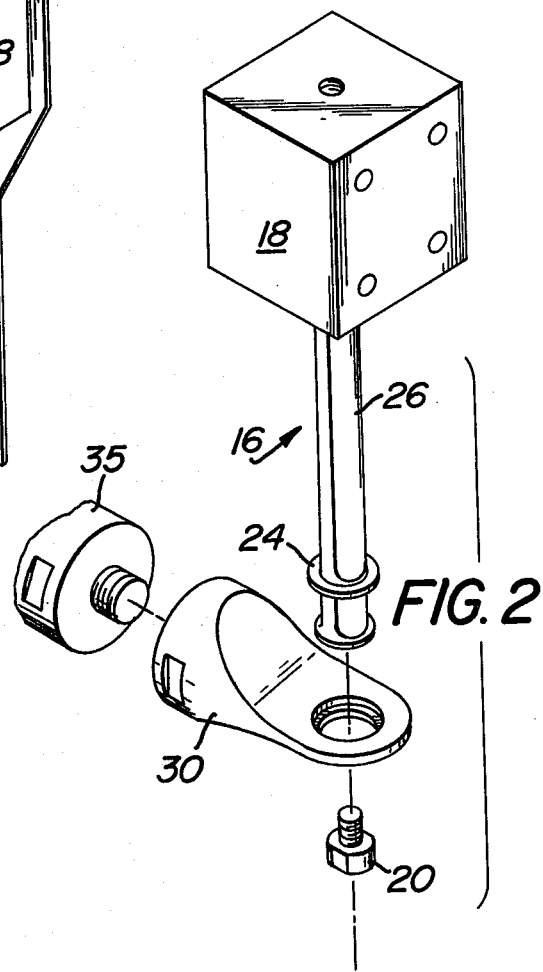
FIG. 2 is an exploded perspective view of the reed and coupler member.

Referring to the drawing in detail, wherein like numerals indicate like elements, there is shown in FIG. 1 an ultrasonic spot welder designated generally as 10. The spot welder 10 vibrates a reed of resonant length in a flexural mode and is an improvement over the welder shown in FIG. 9 of said U.S. Pat. No. 2,946,119.

The welder 10 includes a metal housing 12 supporting at its lower end an anvil 14. Anvil 14 is preferably a non-resonant or contraresonant anvil. Anvil 14 may be of the type disclosed in U.S. Pat. No. 3,695,500. Anvil 14 may have a tip 22 particularly if the members to be welded are small.

A reed 16 of resonant length is provided for cooperation with the anvil 14. Reed 16 is vertically disposed and may be made from any one of a wide variety of metals used heretofore in connection with reeds of resonant length associated with an ultrasonic welder. Reed 16 is preferably integral at its upper end in one piece with a mass 18. Reed 16 and mass 18 may be separate members appropriately coupled together to minimize vibratory losses. Mass 18 is removably bolted to a slide plate 19 guided for vertical movement by a guide member 21 supported by the housing 12.

The reed 16 has a removable welding tip 20 attached to its lower end for cooperation with anvil 14. See FIG. 3. A circular flange 24 is provided intermediate the ends of the reed 16. Flange 24 is preferably located from the tip end of the reed 16 by a distance corresponding to ¼ wave length of vibratory energy in reed 16 so as to facilitate coupling of vibratory energy to the reed 16 at an anti-node.

Reed 16 is non-circular cross section as will be apparent from the drawings. In particular, see FIG. 4. Reed 16 had an initial diameter greater than that required for the power requirements. The circular cross section of the reed was then changed by providing flats 26 and 28 on opposite faces of the reed 16 so as to provide major and minor transverse dimensions while at the same time producing a reed having the required cross sectional area for power requirements. The flats 26 and 28 are provided on the reed 16 above and below the flange 24 without changing the circular configuration of flange 24 which remains concentric with the longitudinal axis of reed 16.

In a typical embodiment, the radius of gyration of the arcuate ends of the major transverse dimension of the reed 16 is 0.500 inches. The distance across the flats 26, 28 is 0.700 inches. The flats 26, 28 have a width of about 0.70 inches. Flange 24 has a diameter of about 1.365 inches. These dimensions are exemplary and may be modified depending upon the power requirements of the welder.

In FIG. 5, there is illustrated a cross section of reed 16' which is identical with reed 16 except as follows. The major transverse dimension of reed 16' is substantially greater than the minor transverse dimension. The minor transverse dimension is defined by the flats 26' and 28' which are slightly concave.

The reed 16 is vibrated in a flexural mode by means of a resonant coupler member 35 oriented so that its longitudinal axis is perpendicular to the planes of the flats 26, 28. Coupler member 35 at the end adjacent the reed 16 is provided with a tapered wedge member 30 having a hole 34 therethrough and countersunk at 32 to thereby define a shoulder for supporting the periphery of the flange 24. The diameter of the recess 32 is approximately the same as the diameter of the flange 24 so that a tight or forcefit is provided. Flange 24 is metallurgically bonded to the wedge 30 in any convenient manner such as by brazing. The diameter of hole 34 is slightly larger than the major transverse dimension of reed 16 so as to provide a small clearance therebetween.

The coupler member 35 is connected to any one of a variety of commercial transducers 36 for transmitting longitudinal vibrations in the coupler member 35. Coupler member 35 is preferably supported from the housing 12 by a non-resonant mount 37 of conventional construction. Mount 37 is connected to the coupler member 35 at a nodal point and may, for example, by of the type shown in U.S. Pat. No. 2,891,178. While the transducer 36 as illustrated of the magnetostrictive type, the transducer may be of the electrostrictive type as disclosed in U.S. Pat. No. 3,283,182. A conventional power supply is coupled to the transducer 36, such as a solid state power supply disclosed in U.S. Pat. No. 3,460,025.

A force-applying means is coupled to the reed 16 or anvil 14 for impelling the tip 20 of the reed 16 into intimate contact with the outer surface of one of the members to be welded while such members are disposed between the tip 20 and tip 22 on the anvil 14. As illustrated, a piston rod 38 has one end removably coupled, such as by the use of threads, to the mass 18 along the axis of reed 16. The other end of piston rod 38 is connected to a piston disposed within fluid cylinder 40. A motive fluid which may be liquid or gas is introduced into the cylinder 40 by way of conduits 42, 44 to move reed 16 toward or away from anvil 14. Cylinder 40 is supported by a transverse brace 43. Any suitable pump with a supply and exhaust valve may be coupled to the conduits 42 and 44. The pressure applied by the reed 16 to the members being welded may be observed at gauge 46 on the housing 12. A knob 48 is provided for adjusting the valve which controls flow of motive fluid to the cylinder 40 to increase or decrease the pressure applied by the reed 16.

When a static force is applied to a beam, the beam deflects in an amount proportional to the radius of gyration of the beam. When a vibratory force is applied to a beam, it is proper to refer to the amplitude of displacement of the beam. The provision of the flats 26, 28 on the reed 16 materially reduces the radius of gyration of the beam 16 whereby its amplitude of displacement is materially increased. With a reed 16 having the dimensions referred to above, the amplitude of displacement has been doubled as compared with a cylindrical reed having the same cross sectional area.

In an ultrasonic welder for welding metal members, the amplitude of displacement is conventionally lower than that of a plastic welder. An ultrasonic welder for welding plastic members usually applies vibratory motion in an axial direction. Due to the configuration of the reed 16, the welder 10 can be used to provide a shear motion at the interface of the members to be welded.

When the welder 10 is used for welding plastic members, they are placed in overlying relation on tip 22 of anvil 14. Then, knob 48 is adjusted so that a clamping force is applied by the reed 16 on the order of 20–40 pounds. When the welder 10 is used to weld metal members, knob 48 is adjusted so that the clamping force applied by reed 16 is on the order of 200–800 pounds depending upon the materials and their thicknesses. The higher the frequency of operation, the lower the amplitude of displacement of the reed 16. Because of the substantially increased amplitude of displacement attained by using reed 16 of the conventional cross sectional area but with flats 26, 28 or 26', 28', welding which normally is done on a 15 kilohertz welder can now be done on a 20 kilohertz welder. The increase in the frequency enables the welding to be done with less audible noise. Also, the present invention enables one to keep the same power density as opposed to trying to accomplish the results of the present invention by using a reed 16 of smaller diameter. Thus, if one sought to increase the amplitude of displacement of a reed by reducing its diameter, that would have the undesirable effect of decreasing the power handling capacity of said reed.

The welder 10 operates within the parameters set forth in said U.S. Pat. No. 2,946,119 such as the clamping force being sufficient to hold the members to be welded in intimate contact at the intended weld zone so that mechanical vibratory energy may be introduced into said zone at a frequency of between 59 and 300,000 cycles per second by the reed vibrating in a flexural mode. The continuous wave mechanical vibration transmitted by reed 16 or 16' is a shear motion substantially perpendicular to the direction of the clamping force and generally parallel to the interface of the members being welded. The temperature at the interface of the members being welded is below the melting temperature of any of the members being welded. Deformation of the materials being welded, particularly with respect to metal members, is generally not more than 10%. Depending upon the materials being welded, the time range for attaining a spot weld is between 0.001 seconds and 6.00 seconds.

Thus, the welder 10 of the present invention is more versatile than those proposed heretofore in that a minor modification or adjustment of the clamping force enables the welder 10 to be used for welding either a pair of metal members or a pair of plastic members. As will be apparent from the above, this versatility is attained in a simple manner involving the shape of the reed 16 or 16' so that it vibrates in a flexural mode generally perpendicular to its minor transverse dimension occurring at the flats 26, 28 or the flats 26', 28'.

The present invention may be embodied in other specific forms without departing from the spirit or essential attributes thereof and, accordingly, reference should be made to the appended claims, rather than to the foregoing specification as indicating the scope of the invention.

I claim:

1. In a non-fusion welder provided with a reed resonant in a flexural mode having a circular flange intermediate its ends, said flange being bonded to a resonant coupler member having its longitudinal axis generally perpendicular to the longitudinal axis of said reed, the improvement comprising said reed having a non-circular cross section except at said flange so as to have a major transverse dimension and a minor transverse dimension, with the major transverse dimension being generally perpendicular to the longitudinal axis of said coupler member.

2. In a welder in accordance with claim 1 wherein said minor transverse dimension is defined by a pair of oppositely disposed flats on said reed.

3. In a welder in accordance with claim 2 wherein said flats are above and below the flange.

4. A welder for ultrasonically welding two plastic members or two metal members comprising a reed, a force-applying member for applying a force to maintain a tip of the reed against an outer face of one of the members to be welded, a resonant coupling member having one end bonded to the reed at a flange intermediate the ends of the reed for transmitting vibratory energy to the reed at a frequency of between 59 and 300,000 cycles per second to cause the reed to vibrate in a flexural mode, an anvil for supporting the members to be welded, means for adjusting the force applied by said force-applying member, the improvement comprising means on said reed for increasing the amplitude of displacement of the reed sufficient so that either metal members or plastic members may be welded by said reed with an appropriate adjustment in the amount of force applied to the members depending on whether they are plastic or metal.

5. A welder in accordance with claim 4 wherein said means for increasing the amplitude of displacement of said reed includes the cross sectional configuration of the reed so that it has a major transverse dimension perpendicular to the longitudinal axis of said coupling member and a minor transverse dimension which is generally parallel to said axis of said coupling member.

6. A welder in accordance with claim 5 wherein said reed has a pair of oppositely disposed flats to define said minor transverse dimension and the flats are interconnected by a segment of a circle defining the major transverse dimension of the reed.

7. A welder in accordance with claim 6 wherein the flats are slightly concave.

8. A method of increasing the amplitude of displacement of a continuous wave vibratory energy transmitting reed comprising providing a reed resonant in a flexural mode with a resonant coupling member connected thereto intermediate the ends of the reed so that the reed vibrates in flexure at a predetermined power density, providing major and minor transverse dimensions on said reed, and transmitting vibratory energy from said coupling member to said reed in a direction which is generally perpendicular to the major transverse dimension of the reed and generally parallel to the minor transverse dimension of the reed.

9. A method in accordance with claim 8 including using the motion of a free end of said reed to weld two platic members together while holding the free end of the reed in contact with an external surface of one of said plastic members at clamping force of 20 to 40 pounds.

10. A method in accordance with claim 8 including using said reed to weld two metal members together while holding a free end of the reed in contact with one metal member with clamping force of 200–600 pounds.

* * * * *